United States Patent
Wang et al.

(10) Patent No.: US 10,048,349 B2
(45) Date of Patent: Aug. 14, 2018

(54) MAIN LOBE AND GRATING LOBE IDENTIFICATION FOR DIRECTION FINDING

(71) Applicant: MEDIATEK INC., Hsinchu (TW)

(72) Inventors: James June-Ming Wang, San Marino, CA (US); Kai-Chun Chou, Taipei (TW); YungPing Hsu, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 270 days.

(21) Appl. No.: 14/817,938

(22) Filed: Aug. 4, 2015

(65) Prior Publication Data

US 2016/0033614 A1 Feb. 4, 2016

Related U.S. Application Data

(60) Provisional application No. 62/032,722, filed on Aug. 4, 2014, provisional application No. 62/037,247, filed on Aug. 14, 2014.

(51) Int. Cl.
| | |
|---|---|
| *G01S 5/02* | (2010.01) |
| *G01S 3/46* | (2006.01) |
| *G01S 3/04* | (2006.01) |
| *G01S 3/42* | (2006.01) |
| *G01S 3/14* | (2006.01) |
| *G01S 3/74* | (2006.01) |

(52) U.S. Cl.
CPC ............. *G01S 3/46* (2013.01); *G01S 3/043* (2013.01); *G01S 3/14* (2013.01); *G01S 3/42* (2013.01); *G01S 3/74* (2013.01)

(58) Field of Classification Search
CPC ..... G01S 3/46; G01S 3/043; G01S 3/74; G01S 3/14; G01S 3/42; G01S 1/02
USPC .................................... 342/417, 423
See application file for complete search history.

(56) References Cited

U.S. PATENT DOCUMENTS

| | | | | |
|---|---|---|---|---|
| 5,724,047 | A * | 3/1998 | Lioio | G01S 3/48 342/417 |
| 6,782,255 | B1 * | 8/2004 | Ranta | H04B 7/005 370/206 |
| 6,839,025 | B1 * | 1/2005 | Reigle | G01S 3/14 342/417 |
| 7,126,533 | B2 * | 10/2006 | Fiore | G01S 3/74 342/383 |

(Continued)

OTHER PUBLICATIONS

International Search Report and Written Opinion of International Search Authority for PCT/US 15/43692 dated Oct. 16, 2015(11 pages).

(Continued)

*Primary Examiner* — Chuong P Nguyen (57) ABSTRACT

A method of direction finding (DF) positioning involving main lobe and grating lobe identification in a wireless communication network is proposed. A receiver performs DF algorithm on radio signals associated with multiple antennas over a first channel frequency and estimates a first set of DF solutions. The receiver performs DF algorithm on radio signals associated with multiple antennas over a second channel frequency and estimates a second set of DF solutions. The receiver then identifies the correct DF solution (e.g., the main lobe direction) by comparing the first set of DF solutions and the second set of DF solutions.

20 Claims, 7 Drawing Sheets

(56) References Cited

U.S. PATENT DOCUMENTS

| | | | | |
|---|---|---|---|---|
| 7,466,262 | B2* | 12/2008 | Stephens | G01S 3/50 |
| | | | | 342/126 |
| 8,674,879 | B2* | 3/2014 | Nilsson | G01S 3/043 |
| | | | | 342/417 |
| 8,929,192 | B2* | 1/2015 | Kainulainen | G01S 3/48 |
| | | | | 342/147 |
| 9,739,878 | B2* | 8/2017 | Gudim | G01S 13/4472 |
| 2004/0072579 | A1* | 4/2004 | Hottinen | G01S 3/40 |
| | | | | 455/456.1 |
| 2007/0279277 | A1* | 12/2007 | Kuramoto | H01Q 3/04 |
| | | | | 342/147 |
| 2009/0322613 | A1* | 12/2009 | Bala | H04B 7/022 |
| | | | | 342/373 |
| 2011/0064008 | A1* | 3/2011 | Guo | H04B 7/0617 |
| | | | | 370/281 |
| 2013/0278463 | A1 | 10/2013 | Nilsson et al. | |
| 2014/0050259 | A1* | 2/2014 | Azizi | H04L 27/2647 |
| | | | | 375/232 |
| 2014/0070996 | A1 | 3/2014 | Kneckt et al. | 342/386 |
| 2016/0370450 | A1* | 12/2016 | Thorn | G01S 3/46 |

OTHER PUBLICATIONS

Ibrahim Tekin, et al. "Simultneous Frequency and Direction Finding Technique Using Frequency Scanning Antenna" Magazine Article; 22nd European Microwave Conference 92; vol. 1; Helsinki University of Technology, Espoo, Finland. Publication Date: Aug. 24, 1992.

* cited by examiner

LINEAR ANTENNA ARRAY

FIG. 5

MAIN LOBE AND GRATING LOBE

FIG. 6

AoD POSITIONING FOR BlueTooth

FIG. 7

AoA POSITIONING FOR BlueTooth

AoD POSITIONING FOR WiFi

FIG. 11

AoA POSITIONING FOR WiFi

MAIN LOBE AND GRATING LOBE IDENTIFICATION FOR DIRECTION FINDING

CROSS REFERENCE TO RELATED APPLICATIONS

This application claims priority under 35 U.S.C. § 119 from U.S. Provisional Application No. 62/032,722 entitled "Main Lobe and Grating Lobe Identification for Direction Finding," filed on Aug. 4, 2014; U.S. Provisional Application No. 62/037,247 entitled "Main Lobe and Grating Lobe Identification for Direction Finding," filed on Aug. 14, 2014, the subject matter of which is incorporated herein by reference.

TECHNICAL FIELD

The disclosed embodiments relate generally to wireless communications system, and, more particularly, to main lobe and grating lobe identification for direction finding in wireless local area networks.

BACKGROUND

IEEE 802.11 is a set of media access control (MAC) and physical layer (PHY) specification for implementing wireless local area network (WLAN) communication, in the unlicensed (2.4, 5, and 60 GHz) frequency bands. The standards and amendments provide the basis for wireless network products using the IEEE 802.11 frequency bands. IEEE 802.11 plays an important role in the growing application of Indoor/Outdoor positioning. Direction fining positioning is achieved from either Angle of Departure (AoD) or Angle or Arrival (AoA). In AoD, the transmitter transmits through multiple antennas and the receiver (tracker) resolves the angle of departure relative to the antenna platform of the transmitter based on the received signals. In AoA, the receiver (tracker) employs multiple antennas to receive signal and resolves angle of arrival relative to its own antenna platform orientation. In both AoD and AoA, only one device with multiple antennas or antenna elements is needed, and only one-way signal transmission is required.

Multiple antenna elements on an antenna platform can be used to estimate AoA or AoD based on the phase difference observed from the received signal at the multiple antenna elements or signals received from the multiple antenna elements. However, when the distance between the antenna elements is small, the phase difference is small. It becomes difficult to achieve good angle resolution. In addition, there will be coupling between antenna elements that can affect AoA or AoD accuracy. On the other hand, when the distance between the antenna elements is larger than half a wavelength, the grating lobe occurs and there are multiple solutions to AoA and AoD positioning.

Therefore, it is desirable to increase the distance between the antenna elements beyond half a wavelength to achieve higher resolution for AoA or AoD positioning while eliminating the effects of the grating lobe.

SUMMARY

A method of direction finding (DF) positioning involving main lobe and grating lobe identification in a wireless communication network is proposed.

A receiving device receives a first plurality of direction finding sounding signals transmitted from a transmitting device via multiple antennas over a first channel frequency. The receiving device performs a DF algorithm based on the first plurality of DF sounding signals and estimating a first set of DF solutions. Next, the receiving device receives a second plurality of direction finding sounding signals transmitted from the transmitting device via the multiple antennas over the second channel frequency. The receiving device then performs the DF algorithm based on the second plurality of DF sounding signals and estimating a second set of DF solutions. Finally, the receiving device determines a final DF solution by comparing the first set of DF solutions and the second set of DF solutions. In one embodiment, the first and the second plurality of DF sounding signals are transmitted via the multiple antennas of the transmitting device, and the DF algorithm is Angle of Departure (AoD). In another embodiment, the first and the second plurality of DF sounding signals are received via the multiple antennas of the receiving device, and the DF algorithm is Angle of Arrival (AoA).

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
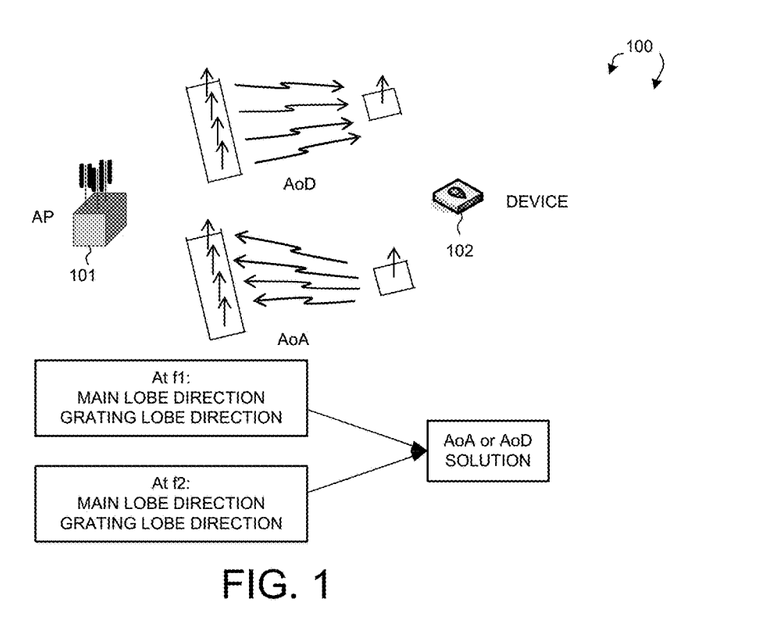
FIG. 1 illustrates a wireless local area network with direction finding positioning in accordance with one novel aspect.

FIG. 1 illustrates a wireless local area network (WLAN) 100 with direction finding (DF) positioning in accordance with one novel aspect. WLAN 100 comprises an access point AP 101 with multiple antennas and a wireless device 102. In order for wireless device 102 to know its own location, direction finding positioning mechanism can be applied. Direction fining positioning is achieved from either Angle of Departure (AoD) or Angle or Arrival (AoA). In AoD, the transmitter transmits through multiple antennas and the receiver (tracker) resolves the angle of departure relative to the antenna platform of the transmitter based on the received signals. In AoA, the receiver (tracker) employs multiple antennas to receive signal and resolves angle of arrival relative to its own antenna platform orientation. In both AoD and AoA, only one device with multiple antennas is needed, and only one-way signal transmission is required.

In the example of FIG. 1, in AoD, AP 101 is the transmitter that transmits through multiple antennas and the receiver device 102 resolves AoD relative to the antenna platform of the AP based on the received signals. Device 102 is then able to determine its location based on the AoD and the AP location, the AP antenna platform orientation information, antenna position on the platform, and/or antenna spatial signature. For those well versed in the art, the antenna spatial signature is the signal characteristics associated different AoD directions, typically, generated by a certain arrangement of antenna polarizations and patterns on the antenna platform. In AoA, AP 101 is the receiver that employs multiple antennas to receive signal from device 102 and resolves AoA relative to its antenna platform after device 102 continues to transmit signal to AP 101. AP 101 is then able to track the position of device 102.

It is desirable to increase the distance between the multiple antenna elements to achieve higher resolution. However, when the distance between the antenna elements is larger than half a wavelength, the grating lobe occurs and there are multiple solutions to AoA and AoD positioning. Either the main lobe points to the tracker or the grating lobe points to the tracker. The main lobe direction or the grating lobe direction provides the solution. In accordance with one novel aspect, AoA or AoD algorithms are performed at different channel frequencies (at frequencies f1 and f2). Since the correct main lobe direction does not change with frequency, the tracker can identify the solution is in the main lobe direction or the grating lobe direction and determine the correct AoA or AoD solution accordingly.

Figure 2:
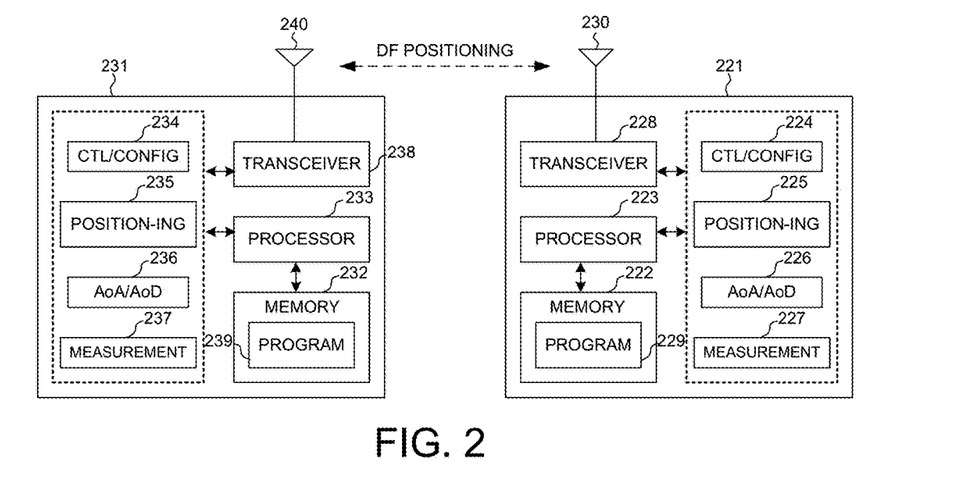
FIG. 2 is a simplified bock diagram of an initiating device and a responding device that carry out certain embodiments of the invention.

FIG. 2 is a simplified bock diagram of an initiating device 221 and a responding device 231 that carry out certain embodiment of the invention. The initiating device is referred to as an initiator, and the responding device is referred to as a responder. Both devices can be an AP station or a no-AP wireless device (Bluetooth/Wi-Fi device). Initiating device 221 comprises memory 222, a processor 223, a control and configuration module 224, a positioning module 225, an AoA/AoD module 226, and a measurement module 227, and a transceiver 228 coupled to multiple antennas 230. Similarly, responding device 231 comprises memory 232, a processor 233, a control and configuration module 234, a positioning module 235, an AoA/AoD module 236, a measurement module 237, and a transceiver 238 coupled to multiple antennas 240. In the transmitting direction, the transceiver converts the baseband signals from the processor to RF signals and sends out to the antennas. In the receiving direction, the processor processes the received baseband signals from the transceiver and invoke different functional modules to perform various features and embodiments supported by the wireless devices.

The different modules are functional modules that can be implemented and configured in software, firmware, hardware, or any combination thereof. The function modules, when executed by processors 223 and 233 (via program instructions 229 and 239 contained in memory 222 and 232), interwork with each other to allow the wireless devices to perform AoA/AoD positioning. For example, the measurement module performs timing measurements of radio signals, the AoD/AoA module estimates AoD/AoA, the positioning module determines the location of the wireless device based on the AoD/AoA estimations, and the control and configuration module configures AoD/AoA related parameters and controls the corresponding AoD/AoA positioning procedures.

Figure 3:
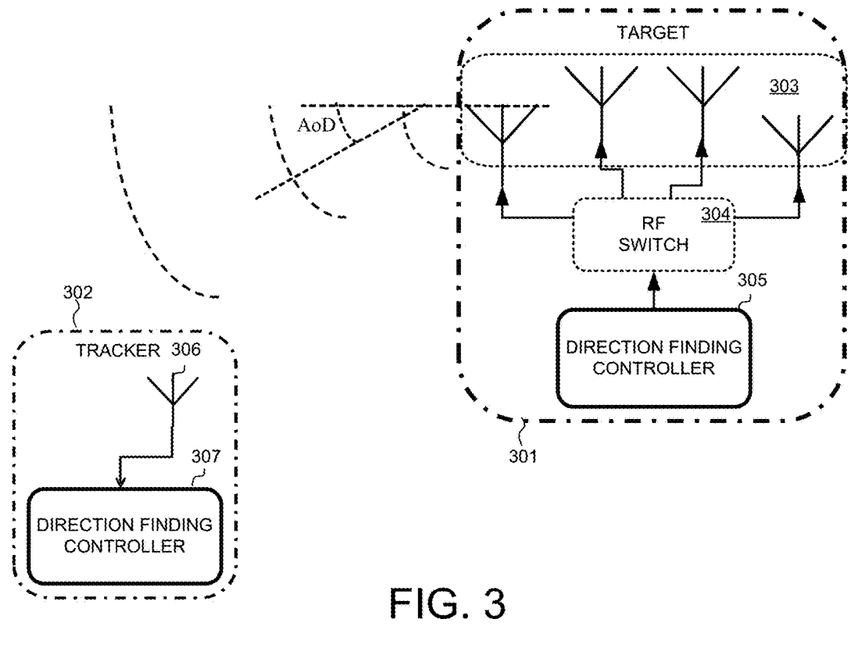
FIG. 3 illustrates direction finding based on angle of departure (AoD) estimation.

FIG. 3 illustrates direction finding based on angle of departure (AoD) estimation. AoD measurement is a method for determining the direction of propagation of a radio signal on an antenna array. In the example of FIG. 3, multiple antenna elements on an antenna platform 303 of target 301 are used to estimate the AoD based on the phase difference observed by tracker 302 from signals transmitted from the multiple antenna elements of target 301. Target 301 has an antenna array 303, an RF switch 304 (for Bluetooth only), and a direction-finding controller 305. Tracker 302 has a single antenna 306 and a direction-fining controller 307. Assuming that the timing delay through each antenna are calibrated, the timing delay of the radio signal from each individual antenna elements of the target to the tracker can be measured based on distance, and the AoD can be calculated accordingly.

In one embodiment, target 301 transmits a packet containing AoD training signal. The packet contains a known section (AoD field) during which the target is executing antenna switching to sequence through antenna elements in pre-determined timing. Tracker 302 receives the AoD training signal and executing I&O sample capturing during reception of the AoD field. The direction-finding controller 307 of the tracker uses the captured I&O samples and antenna array information to calculate the AoD of the packet transmitted by the target. The knowledge of AoD can be combined with the knowledge of the distance between the target and the tracker so that the tracker can determine its own location.

Figure 4:
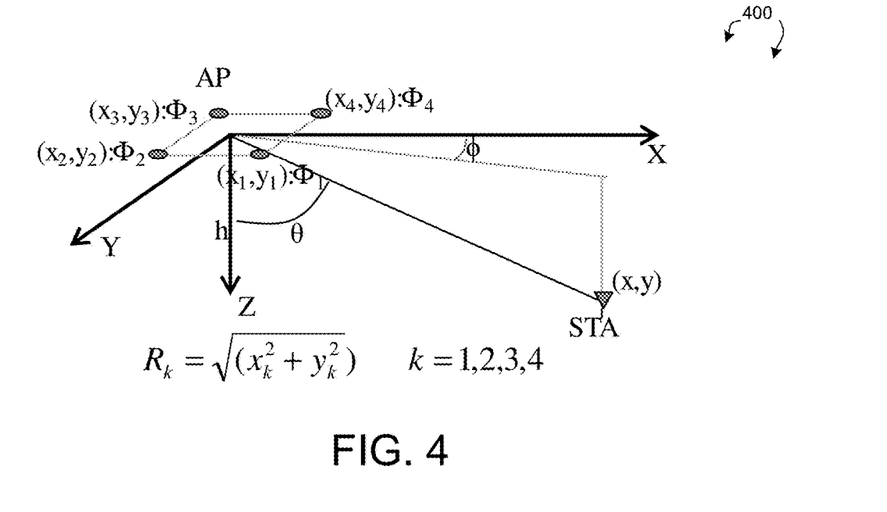
FIG. 4 illustrates AoD and positioning with additional details.

FIG. 4 illustrates AoD and positioning with additional details. In the example of FIG. 4, an access point (AP) is located above the floor with height h, and having four antennas have the same height as the AP, while a wireless station (STA) is located on the floor. The four AP antennas are indexed by (k=1, 2, 3, 4), and each antenna had its location corresponding to $(x_k, y_k)$ or $(R_k, \phi_k)$, where $(x_k, y_k)$ indicates the X-Y plane coordinates of each antenna, $R_k$ indicates the distance to the X-Y plane origin and $\phi_k$ indicates the angle from X-axis of each antenna. The STA location can be represented by its X-Y plane coordinates (h, x, y) or (r, θ, φ), where r indicates the STA distance to the AP, θ is the STA angle to Z-axis, and φ is the STA angle from X-axis.

The AP transmits radio signals to the STA via four antennas, and the STA estimates the AoD from the received signals transmitted from the four antennas of the AP. The STA received signals $r_k(t)$ transmitted from antenna k of S(t) with noise $n_k(t)$ can be represented as:

$$r_k(t) = e^{-j\frac{2\pi R_k}{\lambda}\cos(\phi-\Phi_k)\sin\theta} \cdot s(t) + n_k(t)$$

and:

h=r*cos(θ)
x=r*sin(θ)*cos(φ)
y=r*sin(θ)*sin(φ)

As a result, the STA location (x, y) can be solved using θ and φ if the AP antenna locations, antenna platform orientation, and the height h (relative to the floor) are known. Algorithms such as Bartlett Beamformer or MUSIC algorithm can be used to solve AoD based on the relative signal phase from different antennas.

In an unlicensed band, different devices share the same frequency band. In order to avoid being interfered on a single channel by other signals, a Bluetooth AP (the target) employs frequency hopping to transmit AoD training signal in different frequency channels. The hopping pattern is transmitted along with the signal. The tracker receives AoD training signals in different channels to enhance its direction finding accuracy. In Wi-Fi or LTE networks, a broadband OFDM signal consisting of multiple frequency tones can be used.

Figure 5:
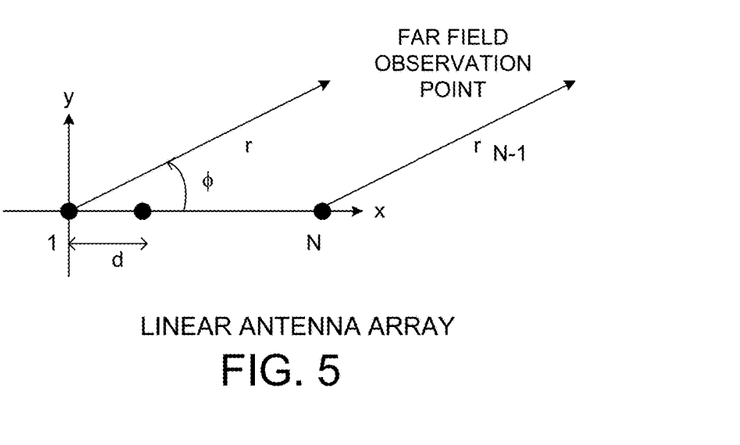
FIG. 5 illustrates one example of AoD positioning implementation using linear antenna array.

FIG. 5 illustrates one example of AoD positioning implementation using linear antenna array. The following equations represent the antenna weight factor and the antenna pattern:

$$W = \begin{bmatrix} w_1 \\ w_2 \\ w_3 \\ \vdots \\ w_N \end{bmatrix} = \begin{bmatrix} I \\ Ie^{j\beta} \\ Ie^{j2\beta} \\ \vdots \\ Ie^{j(N-1)\beta} \end{bmatrix}$$

$$AF = f_{array}(\theta = \pi/2, \phi) = \sum_{i=1}^{N} w_i e^{jb_i} = I \sum_{i=1}^{N} e^{j(i-1)\beta} e^{j(i-1)d\cos\phi}$$

$$= 1 + e^{j(kd\cos\phi+\beta)} + e^{j2(kd\cos\phi+\beta)} + \ldots + e^{j(N-1)(kd\cos\phi+\beta)}$$

$$= \sum_{n=1}^{N} e^{j(n-1)\psi} = \frac{\sin\left(N\frac{\psi}{2}\right)}{\sin\left(\frac{\psi}{2}\right)} e^{j(N-1)\frac{\psi}{2}}$$

where $\psi = kd\cos\phi + \beta$ and $0 \leq \phi, \beta \leq 2\pi$ $$|AF_n(\psi)| = \frac{1}{\Gamma}\left|\frac{\sin\left(N\frac{\psi}{2}\right)}{\sin\left(\frac{\psi}{2}\right)}\right|$$

Where
W is the antenna beam forming weight vector
AF is the array factor which describes the antenna pattern
d is the distance between each antenna element
θ is the scanning angle
From the above equations, for antenna weight $W_i$, the beam peaks occur at:

$$\phi = \cos^{-1}\left[\frac{\lambda}{2\pi d}(-\beta \pm 2m\pi)\right]$$

$$W_i = Ie^{j(i-1)\beta}$$

There could be multiple beam peaks. While the main lobe occurs at m=0, the grating lobe could also occur at m≠0. For example, if the main lobe beam direction at $\phi_m$=60 degree and $$\beta = -\frac{\pi d}{\lambda},$$

and the 1$^{st}$ grating lobe (if exists) occurs at:

$$\phi_g = \cos^{-1}\left[\frac{\lambda}{2\pi d}(-\beta + 2\pi)\right]$$

Note that at different frequencies (channels), the difference between the main lobe direction and the first grating lobe direction changes:

$$\phi_{g,1} = \cos^{-1}\left[\frac{\lambda_1}{2\pi d}(-\beta + 2\pi)\right],$$

$$\phi_{g,2} = \cos^{-1}\left[\frac{\lambda_2}{2\pi d}(-\beta + 2\pi)\right], \text{ if } \lambda_1 \neq \lambda_2$$

For a maximum scanning angle of $\theta_{max}$, the grating lobe can be avoided if the distance between the antenna elements d is less than $d/\lambda \leq 1/(1+\sin(\theta_{max}))$. However, if an antenna array design satisfies such condition, there are correlation between the antenna elements, which can affect the AoD accuracy.

Therefore, it is desirable to increase the separation between the antenna elements "d" beyond the above condition. When grating lobe appears, the AoD will have multiple solutions, either main lobe points to the tracker or grating lobe points to the tracker. Either the main lobe direction towards the tracker or the grating lobe direction towards the tracker provides the correct solution. Thus, it is desirable to have a method that can distinguish the main lobe and the grating lobe directions for providing the correct solution.

Figure 6:
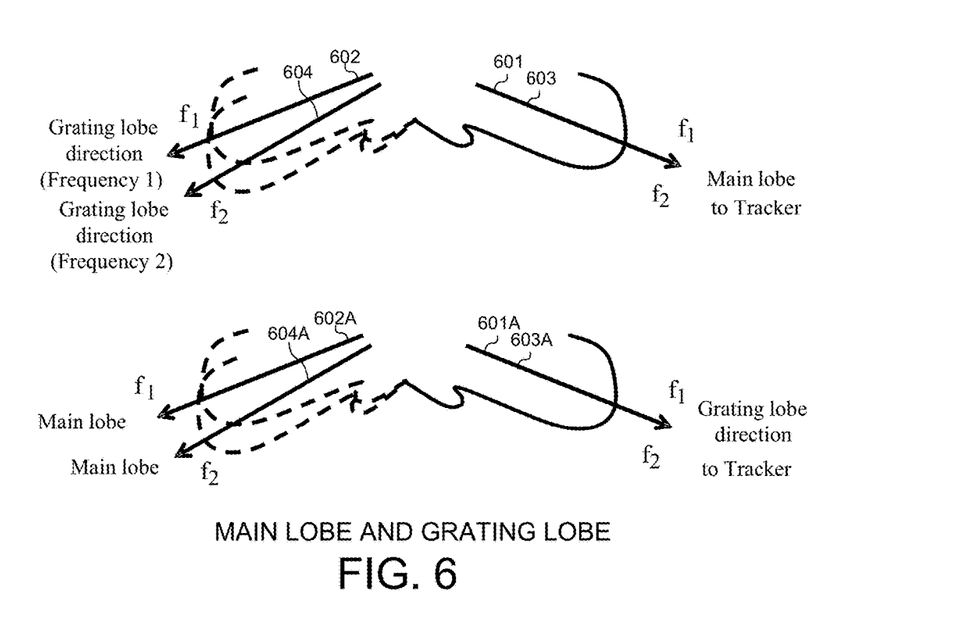
FIG. 6 illustrates identifying the main lobe and grating lobe for AoD positioning.

FIG. 6 illustrates identifying the main lobe and grating lobe directions for AoD positioning. A target transmits AoD training signals to a target at different channel frequencies. The tracker performs AoD algorithm (such as MUSIC or Bartlett) at a first channel frequency (f1). The tracker finds the direction(s) when the main lobe points at the tracker direction as depicted by arrow 601, or when the grating lobe points at the tracker direction as depicted by arrow 602. Note that the AoD algorithm peaks when either the main lobe or the grating direction points to the tracker.

Next, the tracker performs AoD algorithm at a second channel frequency (f2). The tracker finds the direction(s) when the main lobe points at the tracker direction as depicted by arrow 603, or when the grating lobe points at the tracker direction as depicted by arrow 604. Note that the AoD algorithm peaks when either the main lobe or the grating direction points to the tracker. If the grating lobe exists, there are two possible solutions, the main lobe direction or the grating lobe direction. The correct solution for AoD does not change with channel frequency. However, the incorrect solution for AoD, changes with channel frequency. As depicted in the top half of FIG. 6, if the tracker is in the main lobe, then the main lobe directions 601 and 603 remain the same when frequency changes from f1 to f2. On the other hand, as depicted in the bottom half of FIG. 6, if the tracker is in the grating lobe direction, then the main lobe directions 602A and 604A changes when frequency changes from f1 to f2. As a result, the tracker can identify whether the main lobe direction or the grating lobe direction determines the corresponding AoD.

Figure 7:
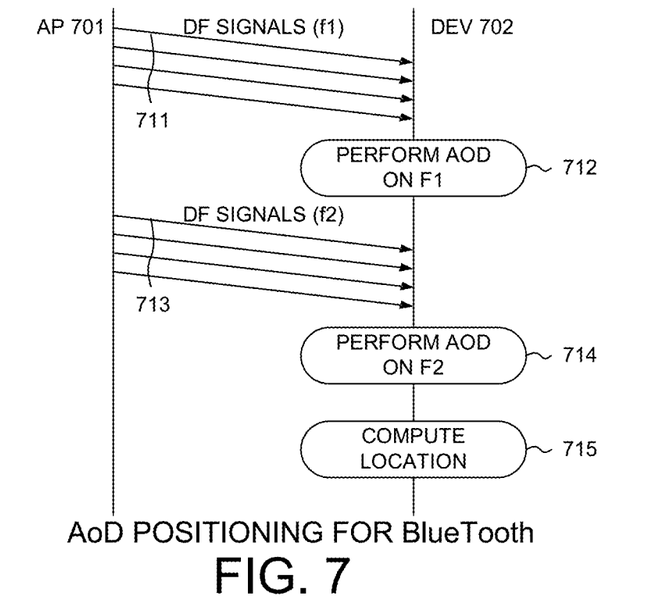
FIG. 7 illustrates a procedure of direction finding positioning for Bluetooth based on AoD.

FIG. 7 illustrates a procedure of direction finding positioning for Bluetooth based on AoD. In this example, a Bluetooth AP 701 is a target for transmitting AoD training signals and a Bluetooth device DEV 702 is a tracker for receiving the AoD training signals and performing AoD algorithm. In a switched antenna implementation, a multiple antenna AP transmits through different antennas at different time slots. The receiver then estimates the relative signal phases of antennas at different time slots to compute the AoD. In step 711, AP 701 transmits AoD training signals at a first frequency f1, the AoD training signals are transmitted through different antennas at different time slots. In step 712, DEV 702 receives the AoD training signals and performs AoD algorithm on channel frequency f1. Similarly, in step 713, AP 701 transmits AoD training signals at a second frequency f2, the AoD training signals are transmitted through different antennas at different time slots. In step 714, DEV 702 receives the AoD training signals and performs AoD algorithm on channel frequency f2. Finally, in step 715, DEV 702 identifies the correct main lobe direction and determines the AoD by comparing different AoD solutions at different channel frequencies and then computes its location accordingly.

Figure 8:
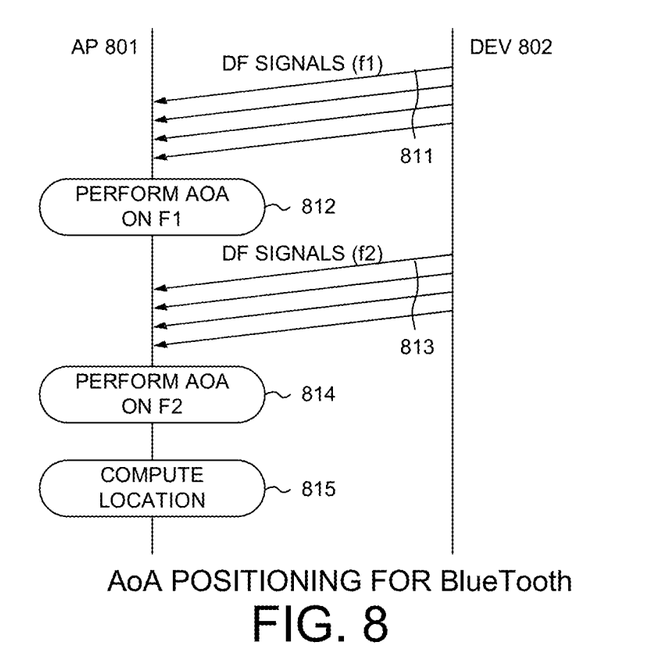
FIG. 8 illustrates a procedure of direction finding positioning for Bluetooth based on AoA.

FIG. 8 illustrates a procedure of direction finding positioning for Bluetooth based on AoA. In this example, a Bluetooth AP 801 is a tracker for receiving AoA training signals and performing AoD algorithm and a Bluetooth device DEV 802 is a target for transmitting the AoA training signals. In a switched antenna implementation, a multiple antenna AP receives through different antennas at different time slots and estimates the relative signal phases of different antennas to compute the AoA. In step 811, DEV 802 transmits AoA training signals at a first frequency f1. In step 812, AP 801 receives the AoA training signals through different antennas at different time slots and performs AoA algorithm on channel frequency f1. Similarly, in step 813, DEV 802 transmits AoA training signals at a second frequency f2. In step 814, AP 801 receives the AoA training signals through different antennas at different time slots and performs AoA algorithm on channel frequency f2. Finally, in step 815, AP 801 identifies the correct main lobe direction and determines the AoA by comparing different AoA solutions at different channel frequencies and then computes the location for DEV 802.

In order to apply AoD positioning, the receiver (tracker) needs to be able to resolve the received radio signals transmitted from the multiple antennas of the same transmitter. In a switched antenna implementation, a multiple antenna AP transmits through different antennas at different time slots. The receiver then estimates the relative signal phases of antennas at different time slots to compute the AoD/AoA. In contrast to the switched antenna implementation, IEEE 802.11 devices have been using multiple antennas simultaneously for transmitting or receiving radio signals (e.g., MIMO, STBC). Therefore, it is desirable that AoD/AoA positioning can be implemented by IEEE 802.11 devices using multiple antennas simultaneously for transmitting or receiving based on existing radio signal waveforms.

Figure 9:
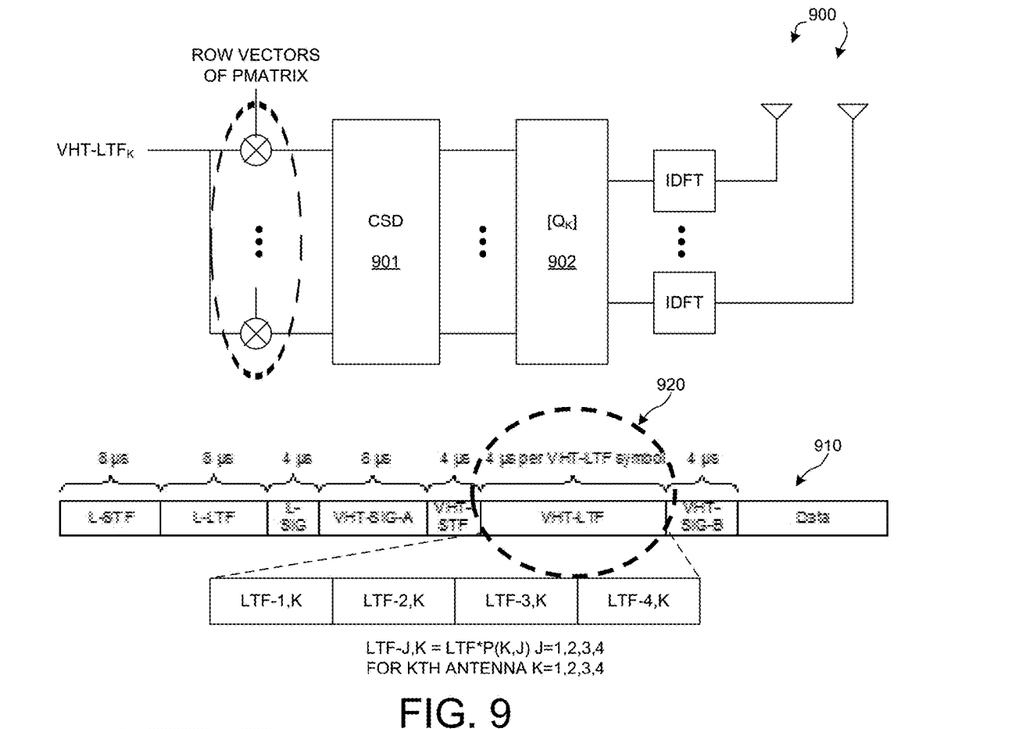
FIG. 9 illustrates one embodiment of AoD positioning in IEEE 802.11 WLANs.

FIG. 9 illustrates one embodiment of AoD positioning by a transmitter 900 in IEEE 802.11. IEEE 802.11ac signal consists of OFDM symbols, which can be 20 MHz, 40 MHz, 80 MHz, or 160 MHz bandwidth. FIG. 9 shows an IEE 802.11ac PPDU 910, which contains L-STF, L-LTF, L-SIG, VHT-SIG-A, VHT-STF, VHT-LFT, VHT-SIG-B, and VHT data fields, each field can have one or multiple OFDM symbols. Each PPDU consists of $N_{STS\text{-}Total}$ VHT-LTF symbols 920. In one embodiment of AoD positioning, a P matrix ($N_{VHTLTF} \times N_{VHTLTF}$) is introduced. The P matrix consists of a number of orthogonal row vectors, where $N_{VHTLTF}$ is the number of LTF symbols. At the transmitter side, non-pilot tones of each VHT-LTF symbol (n=0, 1 ... $N_{VHTLTF}-1$) in a transmit antenna chain are multiplied by an entry from the row vector of the P matrix, for each $k^{th}$ subcarrier. The radio signal might be further processed by a cyclic shift delay CSD 901, a beamforming/precoding module 902 having precoding matrix $[Q_k]$, multiple IDFTs, and then simultaneously transmitted from the antennas.

At the receiver side, the radio signal from each transmit antenna is recovered by the inner product of the corresponding row vector of the P matrix and the received LTF symbols. Note that the row vectors of the P matrix are orthogonal to each other. When a receiver multiplies the received LTF symbols with a row vector and sum these symbols together, it recovers the LTF symbols are used to resolve the signals for different antennas. As illustrated in FIG. 9, for each antenna, a row vector of the P matrix is used to multiply the LTF symbols in time domain (one entry of the row vector for each LTF symbol). Because the row vectors in the P matrix are orthogonal vectors, the receiver can recover signal from each antenna by using the inner product of a corresponding row vector and the received LTF symbols:

$$\text{signal from antenna } m = \sum_n LTF_n(t)P_{m,n}$$

$$\delta_{k,m} = \sum_n P_{k,n}P_{m,n}$$

where $\delta_{k,m} = 1$ if $k = m$ and $\delta_{k,m} = 0$ if $k \neq m$

Figure 10:
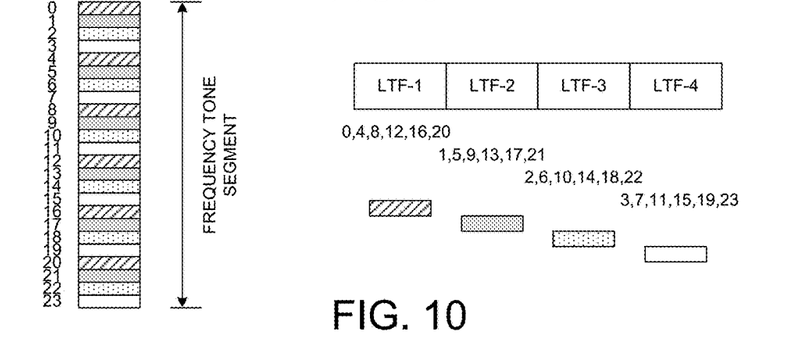
FIG. 10 illustrates one embodiment of resolving the main lobe and grating lobe direction for AoD/AoA positioning in IEEE 802.11.

FIG. 10 illustrates one embodiment of resolving the main lobe and grating lobe for AoD/AoA positioning in IEEE 802.11. In general, the main lobe and grating lobe for AoD/AoA positioning can be resolved using a broadband signal such as OFDM that consists of multiple tones. Assume the number of LFT symbols is equal to the number of antennas. At the transmitter side, each LTF symbol contains groups of subcarrier tones, and different groups of subcarrier tones are allocated to different antennas to form an LTF waveform for transmission. Note that different groups of subcarrier tones do not overlap each other in a LTF symbol. At the receiver side, each AoD/AOA training signal is resolved by processing a corresponding group of subcarrier tones to extract the AoD/AOA training signal associated with each antenna.

The grating lobe direction will be shifted at different frequency tones while the main lobe direction remains the same. If only one main direction is found, then a unique solution is found. If more than one directions are found, a preferred embodiment is to divide OFDM into multiple segments, and each contains multiple continuous OFDM tones. If more than one directions are found in multiple segments, then the direction common among the multiple segments is the correct solution. This allows the antenna elements within the antenna array to be separated by more than the distance given by the equation $d/\lambda \leq 1/(1+\text{Sin}(\theta_{max}))$.

Figure 11:
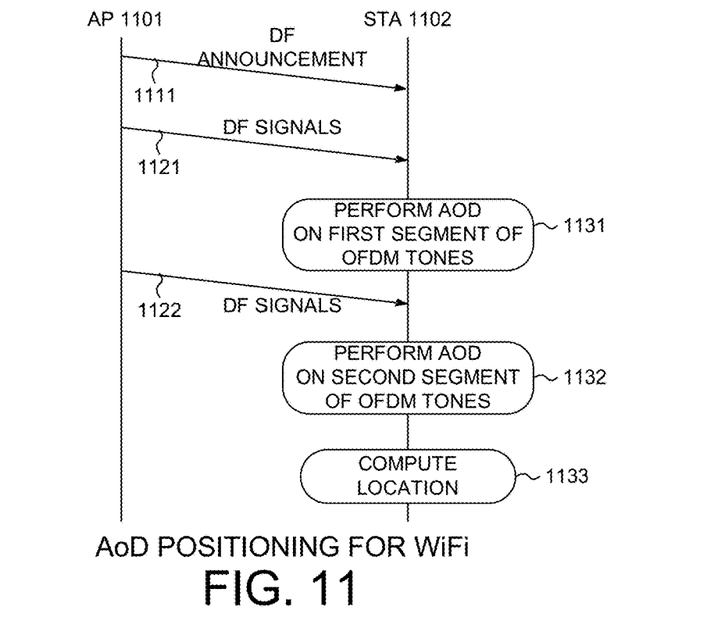
FIG. 11 illustrates a procedure of direction finding positioning for WLAN based on AoD.

FIG. 11 illustrates a procedure of direction finding positioning in a WLAN based on AoD. The WLAN comprises an AP 1101 with multiple antennas and a station STA 1102. For example, AP 1101 with multiple antenna platform is deployed in strategic location such as ceiling or wall in a venue. In step 1111, AP 1101 transmits a direction finding announcement signal indicating the immediate subsequent direction finding sounding signals for DF positioning. In step 1121, AP 1101 transmits DF sounding signals simultaneously via the multiple antennas over a first segment of OFDM tones, while STA 1102 receives the DF sounding signals. In step 1131, STA 1102 performs AoD estimation based on the received DF sounding signals transmitted from different antennas over the first segment of OFDM tones. In step 1122, AP 1101 transmits DF sounding signals simultaneously via the multiple antennas over a second segment of OFDM tones, while STA 1102 receives the DF sounding signals. In step 1132, STA 1102 performs AoD estimation based on the received DF sounding signals transmitted from different antennas over the second segment of OFDM tones. Finally, in step 1133, STA 1102 identifies the main lobe direction and estimates the final AoD and computes its location based on the AoD, the AP location, AP antenna platform orientation, antenna position, and/or spatial signature information.

Figure 12:
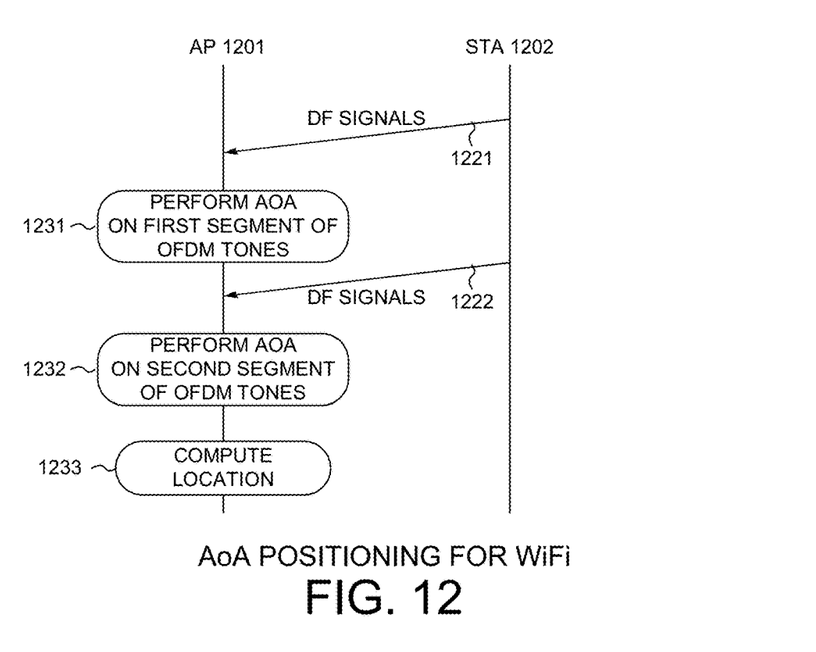
FIG. 12 illustrates a procedure of direction finding positioning for WLAN based on AoA.

FIG. 12 illustrates a procedure of direction finding positioning in a WLAN based on AoA. The WLAN comprises an AP 1201 with multiple antennas and a station STA 1202. In step 1221, STA 1202 transmits the DF sounding signals over a first segment of OFDM tones, while AP 1201 receives the DF sounding signals simultaneously via the multiple antennas. In step 1231, AP 1201 performs AoA estimation based on the DF sounding signals received from different antennas over the first segment of OFDM tones. In step 1222, STA 1202 transmits the DF sounding signals over a second segment of OFDM tones, while AP 1201 receives the DF sounding signals simultaneously via the multiple antennas. In step 1232, AP 1201 performs AoA estimation based on the DF sounding signals received from different antennas over the second segment of OFDM tones. Finally, in step 1233, AP 1201 identifies the main lobe direction and estimates the final AoA and computes the location for STA 1202.

Figure 13:
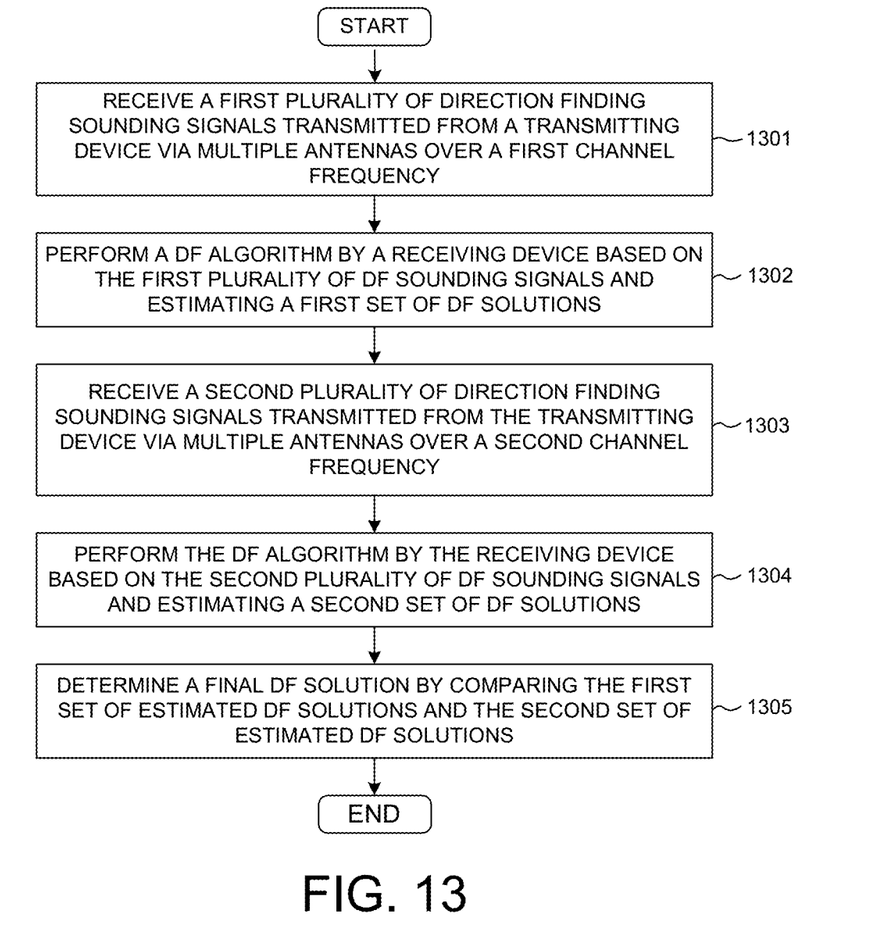
FIG. 13 is a flow chart of a method of direction finding positioning by identifying main lobe direction and grating lobe direction in accordance with one novel aspect.

FIG. 13 is a flow chart of a method of direction finding positioning in accordance with one novel aspect. In step 1301, a receiving device receives a first plurality of direction finding sounding signals transmitted from a transmitting device via multiple antennas over a first channel frequency. In step 1302, the receiving device performs a DF algorithm based on the first plurality of DF sounding signals and estimating a first set of DF solutions. In step 1303, the receiving device receives a second plurality of direction finding sounding signals transmitted from the transmitting device via the multiple antennas over the second channel frequency. In step 1304, the receiving device performs the DF algorithm based on the second plurality of DF sounding signals and estimating a second set of DF solutions. In step 1305, the receiving device determines a final DF solution by comparing the first set of DF solutions and the second set of DF solutions. In one embodiment, the first and the second plurality of DF sounding signals are transmitted via the multiple antennas of the transmitting device, and the DF algorithm is Angle of Departure (AoD). In another embodiment, the first and the second plurality of DF sounding signals are received via the multiple antennas of the receiving device, and the DF algorithm is Angle of Arrival (AoA).

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method of wireless communication, the method comprising:
   at a receiving device, receiving a first plurality of direction finding (DF) sounding signals transmitted from a transmitting device through a first frequency channel, wherein said first plurality of direction finding (DF) sounding signals correspond to a plurality of antennas;
   said receiving device determining a first set of estimated directions of said receiving device relative to said transmitting device based on the first plurality of DF sounding signals, wherein said first set of estimated directions comprises a first direction and a second direction;
   said receiving device receiving a second plurality of DF sounding signals transmitted from said transmitting device over a second frequency channel that is different from said first frequency channel, wherein said second plurality of direction finding (DF) sounding signals correspond to said plurality of antennas;
   said receiving device determining a second set of estimated directions of said receiving device relative to said transmitting device based on said second plurality of DF sounding signals, wherein said second set of estimated directions comprise a third direction and a fourth direction; and
   said receiving device identifying a main lobe direction as a determined direction of said receiving device relative to said transmitting device, wherein said identifying said main lobe direction comprises: comparing said first direction with said third direction; and comparing said second direction with said fourth direction.

2. The method of claim 1, wherein said identifying said main lobe direction comprises one of: identifying said first direction as said main lobe direction responsive to a decision that said third direction is identical with said first direction; and identifying said second direction as said main lobe direction responsive to a decision that said second direction is identical with said fourth direction.

3. The method of claim 1, wherein said transmitting device comprises said plurality of antennas, wherein said first and said second plurality of DF sounding signals are transmitted via said plurality of antennas, and wherein further said determining said first set of estimated directions further comprises said receiving device performing an Angle of Departure (AoD) process.

4. The method of claim 1, wherein said receiving device comprises said plurality of antennas, wherein said first and said second plurality of DF sounding signals are received via said plurality of antennas, and wherein further said determining said first set and said second set of estimated directions further comprises said receiving device performing an Angle of Arrival (AoA) process.

5. The method of claim 1, wherein said first and said second plurality of direction finding (DF) sounding signals are one of AoD and AoA training signals.

6. The method of claim 1, wherein said transmitting device comprises said plurality of antennas, and wherein said first plurality of DF sounding signals are transmitted via said plurality of antennas in different time slots by antenna witching.

7. The method of claim 1, wherein said transmitting device is a Bluetooth device, and wherein further frequency hopping is applied during transmitting said first plurality and said second plurality of DF sounding signals, and wherein said first plurality and said second plurality of DF sounding signals are received by said receiving device in different frequency channels.

8. The method of claim 1, wherein said first plurality of DF sounding signals are transmitted simultaneously via the plurality of antennas, and wherein each DF sounding signal comprises a number of Long Training Field (LTF) symbols transmitted via a corresponding antenna, and further comprising said receiving device resolving each of said LIT symbol by using a unique row vector of a P matrix to modulate.

9. The method of claim 1, wherein said first plurality and said second plurality of DF sounding signals are transmitted using Orthogonal Frequency-Division Multiplexing (OFDM), wherein said first plurality of DF sounding signals comprises a first segment of OFDM tones, and wherein the second plurality of DF sounding signals comprises a second segment of OFDM tones.

10. The method of claim 9, wherein each set of said first set and said second set of estimated directions comprises multiple main lobe directions, and wherein said identifying comprises:
identifying a common main lobe direction common to said first set and said second set of estimated directions; and
designating said common main lobe direction as said determined direction.

11. A wireless communication device comprising:
a receiver configured to:
receive a first plurality of direction finding (DF) sounding signals transmitted from a transmitting device through a first frequency channel, wherein said first plurality of direction finding (DF) sounding signals correspond to a plurality of antennas; and
receive a second plurality of DF sounding signals transmitted from said transmitting device over a second frequency channel that is different from said first frequency channel, wherein said second plurality of direction finding (DF) sounding signals correspond to said plurality of antennas;
a processor coupled to said receiver; and
a memory coupled to said processor and comprising instructions that, when executed by said processor, cause said processor to perform a method of:
determining a first set of estimated directions of said receiving device relative to said transmitting device based on the first plurality of DF sounding signals, wherein said first set of estimated directions comprises a first direction and a second direction;
determining a second set of estimated directions of said receiving device relative to said transmitting device based on said second plurality of DF sounding signals, wherein said second set of estimated directions comprise a third direction and a fourth direction; and
identifying a main lobe direction as a determined direction of said receiving device relative to said transmitting device, wherein said identifying said main lobe direction comprises: comparing said first direction with said third direction; and comparing said second direction with said fourth direction.

12. The wireless communication device of claim 11, wherein said identifying said main lobe direction comprises one of: identifying said first direction as said main lobe direction responsive to a decision that said third direction is identical with said first direction; and identifying said second direction as said main lobe direction responsive to a decision that said second direction is identical with said fourth direction.

13. The wireless communication device of claim 11, wherein said first and said second plurality of DF sounding signals are transmitted via said plurality of antennas of said transmitting device, and wherein further said determining said first set of estimated directions further comprises said receiving device performing an Angle of Departure (AoD) process.

14. The wireless communication device of claim 11 further comprising said plurality of antennas coupled to said receiver, wherein said first and said second plurality of DF sounding signals are received via said plurality of antennas, and wherein further said determining said first set and said second set of estimated directions further comprises said receiving device performing an Angle of Arrival (AoA) process.

15. The wireless communication device of claim 11, wherein said first and said second plurality of direction finding (DF) sounding signals are one of AoD and AoA training signals.

16. The wireless communication device of claim 11, wherein said transmitting device comprises said plurality of antennas, and wherein said first plurality of DF sounding signals are transmitted via said plurality of antennas in different time slots by antenna switching.

17. The wireless communication device of claim 11, wherein said transmitting device is a Bluetooth device, and wherein further frequency hopping is applied during transmitting said first plurality and said second plurality of DF sounding signals, and wherein said first plurality and said second plurality of DF sounding signals are received in different frequency channels.

18. The wireless communication device of claim 11, wherein said first plurality of DF sounding signals are transmitted simultaneously via the plurality of antennas of said transmitting device, and wherein each DF sounding signal comprises a number of Long Training Field (LTF) symbols transmitted via a corresponding antenna, and wherein said method further comprises resolving each of said LTF symbol by using a unique row vector of a P matrix to modulate.

19. The wireless communication device of claim 11, wherein said first plurality and said second plurality of DF sounding signals are transmitted using Orthogonal Frequency-Division Multiplexing (OFDM), wherein said first plurality of DF sounding signals comprises a first segment of OFDM tones, and wherein the second plurality of DF sounding signals comprises a second segment of OFDM tones.

20. The wireless communication device of claim 19, wherein each set of said first set and said second set of estimated directions comprises multiple main lobe directions, and wherein said identifying comprises:
identifying a common main lobe direction common to said first set and said second set of estimated directions; and
designating said common main lobe direction as said determined direction.

* * * * *